United States Patent [19]
Ishida et al.

[11] Patent Number: 5,360,585
[45] Date of Patent: Nov. 1, 1994

[54] METHOD FOR CORRECTING FOR THRUST FORCE GENERATED WHEN A CUTTER FOR GRANULATING PLASTICS IS ROTATED IN WATER

[75] Inventors: Yasuhiko Ishida; Minoru Yoshida; Hideki Mizuguchi; Takaaki Okita; Tetsuo Makida, all of Hiroshima, Japan

[73] Assignee: The Japan Steel Works, Ltd., Tokyo, Japan

[21] Appl. No.: 83,568

[22] Filed: Jun. 30, 1993

Related U.S. Application Data

[60] Continuation-in-part of Ser. No. 794,919, Nov. 20, 1991, abandoned, which is a division of Ser. No. 704,148, May 22, 1991, Pat. No. 5,190,768.

[30] Foreign Application Priority Data

May 22, 1990 [JP] Japan ................. 2-130240

[51] Int. Cl.⁵ ................................. B28B 11/16
[52] U.S. Cl. ......................... 264/40.1; 264/142
[58] Field of Search ............ 264/40.1, 40.3, 142, 264/40.5; 425/67, 142, 310, 311, 313

[56] References Cited

U.S. PATENT DOCUMENTS

| | | | |
|---|---|---|---|
| 3,912,434 | 10/1975 | Nagahara et al. | 425/313 |
| 4,184,833 | 1/1980 | Buchan et al. | 425/311 |
| 4,249,879 | 2/1981 | Anders et al. | 425/311 |
| 4,260,356 | 4/1981 | Fujiwara et al. | 264/142 |
| 4,529,370 | 7/1985 | Holmes et al. | 264/142 |
| 4,569,809 | 2/1986 | Baggett | 264/142 |
| 4,710,113 | 12/1987 | Voigt | 425/311 |
| 4,728,276 | 3/1988 | Pauley et al. | 264/142 |
| 4,759,889 | 7/1988 | Voss | 264/40.1 |
| 4,861,529 | 8/1989 | Groebi et al. | 264/40.1 |
| 5,051,217 | 9/1991 | Alpar et al. | 264/40.1 |
| 5,110,523 | 5/1992 | Guggiari | 425/67 |

FOREIGN PATENT DOCUMENTS

| | | | |
|---|---|---|---|
| 0418941 | 3/1991 | European Pat. Off. | 425/311 |
| 2759111 | 3/1977 | Germany | 425/311 |
| 3405978 | 4/1985 | Germany | 425/311 |
| 425409 | 1/1992 | Japan . | |

*Primary Examiner*—Jay H. Woo
*Assistant Examiner*—Robert B. Davis
*Attorney, Agent, or Firm*—Sughrue, Mion, Zinn, Macpeak & Seas

[57] ABSTRACT

A plastics granulating process wherein a cutter holder having cutter knives is driven to rotate along a die surface of a die and a housing is provided with a cutter drive shaft for driving the cutter holder to rotate in a manner so that plastics particles are obtained by cutting resin extruded from the die. A sleeve is axially movably provided in the housing so as to coaxially rotatably hold the cutter drive shaft, and a pressure medium is supplied into space chambers formed between the sleeve and the housing so that the cutter drive shaft moves axially with axial movement of the sleeve and the cutter knives presses against the die surface with a controlled thrust force.

22 Claims, 4 Drawing Sheets

METHOD FOR CORRECTING FOR THRUST FORCE GENERATED WHEN A CUTTER FOR GRANULATING PLASTICS IS ROTATED IN WATER

This application is a continuation-in-part of application Ser. No. 07/794,919 filed on Nov. 20, 1991 (now abandoned) which is a divisional of application of Ser. No. 07/704,148 filed on May 22, 1991 and issued as U.S. Pat. No. 5,190,768.

BACKGROUND OF THE INVENTION

1. Field of the Invention

The present invention generally relates to a plastics granulating method, and particularly relates to a novel improvement of the plastics granulating method in which a pressure medium is supplied to move the cutter drive shaft forward/backward so that knives or the like can be automatically and easily controlled to adjust the contacting state between the knives and the die surface.

2. Description of the Related Art

Conventionally, various plastics granulating apparatus have been used. A typical device is disclosed in Japanese Patent Unexamined Publication No. Hei-1-22551, as shown in FIGS. 2 and 3.

In the drawings, reference numeral 1 designates a granulating machine. The granulating machine 1 is constituted by a manifold 2 for circumferentially distributing melted resin extruded from an extruding machine (not shown), a die 3 attached on the manifold 2 to be in close contact therewith, a cutter casing 4 attached on the die 3, and a cutter 5 provided in the cutter casing 4.

The die 3 is disc-shaped, and a large number of nozzles 6 are formed axially through a ring-like region of the die 3 surrounding the center of the same. Both ends of each nozzle 6 are opened into a ring-like resin path 2a of the manifold 2 and into the cutter casing 4, respectively.

The cutter casing 4 is removably fixed on the manifold 2 through bolts 7 to be in close contact with the surface of the die 3. The cutter casing 4 has a hot-water inlet 8 and a hot-water outlet 9 to allow hot water to be introduced therein.

The cutter 5 has a configuration so that a plurality of cutter knives 11 are radially fixedly supported on the outer circumference of an end surface of a cutter holder 10 facing the die 3. The cutter knives 11 are provided in opposition to a die surface 3a of the die 3, that is, in opposition to the surface of the ring-like region through which the nozzles 6 are formed. A rotary force is transmitted to the cutter holder 10 through a cutter drive shaft 12 disposed on the central axial line of the cutter holder 10.

The cutter drive shaft 12 is rotatably supported in a cylindrical casing 13 through bearings 14 and is fixed axially with respect to the casing 13. The casing 13 is axially slidably supported by a housing 15 fixed on the back surface of the cutter casing 4. Therefore, the cutter drive shaft 12 is axially movable together with the casing 13. A fine adjustment mechanism 19 constituted by a worm 16, a worm wheel 17, and adjustment screws 18 is provided between the housing 15 and the casing 13 so that the casing 13 can be axially moved by the rotation of the worm 16. A compression spring 20 is provided between a rear end portion (a right end portion in FIG. 2) of the casing 13 and the housing 15 to urge the casing 13 and the cutter drive shaft 12 against the die 3 to minimize axial play of the cutter driving shaft 12 due to gaps of the bearings 14, play of the screws of the fine adjustment mechanism 19, or the like.

The base end of the cutter drive shaft 12 is coupled with an output shaft 22 of a rotary machine (not shown), such as an electric motor or the like, through a coupling 21 which allows rotary movement of the cutter drive shaft 12.

A gap portion between the base end portion of the cutter drive shaft 12 and a housing portion 15a surrounding the base end portion is sealed by a pair of front and rear sealing members 23 and an oil reservoir 24 is formed in the gap portion. The oil reservoir 24 is communicated with an oil chamber 27 on the small-diameter piston 26 side of a booster 25 provided outside the housing 15. High pressure air is fed from a pressure air source (not shown) into a pressure chamber 29 on the large-diameter piston 28 side of the booster 25 through a change-over valve 30, a reducing valve 31, and an air valve 32. The change-over valve 30 is configured so that the pressure chamber 29 of the booster 25 is opened into the atmosphere when the change-over valve 30 is switched to the illustrated position and the pressure chamber 29 and the reducing valve 31 are communicated with each other when the change-over valve 30 is switched to the right position.

An oil hole 33 is formed in the base end portion of the cutter drive shaft 12 to be opened into the oil reservoir 24 provided in the surrounding of the base end portion. An oil path 34 is formed through the central portion of the cutter drive shaft 12 from the front end surface thereof, that is, the end surface at the die 3 side, to the oil hole 33 of the base end portion.

Next, as shown in FIG. 3, the cutter holder 10 has portions which are substantially conical and cylindrical in shape respectively, and is configured so that a front end portion of the cutter drive shaft 12 is slidably fitted into the cutter holder 10 and an O ring 35 is provided between the inner circumferential surface of the cutter holder 10 and the outer circumferential surface of the cutter drive shaft 12. Further, a blanking cover 37 is attached on the end surface of the conical portion of the cutter holder 10 at the side of the die 3 through a gasket 36, and an oil-tight closed chamber 38 is formed between the cutter holder 10 and the front end surface of the cutter drive shaft 12. Pressurized oil is fed into the closed chamber 38 through the oil path 34 formed in the cutter drive shaft 12.

A torque transmission disc plate 40 having an involute spline 39 formed in its outer circumferential surface is fixed on the front end surface of the cutter drive shaft 12. A torque transmission ring 42 having an involute spline 41 formed in its inner circumferential surface, on the other hand, is fixed on in the cutter holder 10. Consequently, by making the splines 39 and 41 engage with each other, the rotary force from the cutter drive shaft 12 is transmitted to the cutter holder 10 and the cutter holder 10 is supported so as to be slidable relative to the cutter drive shaft 12.

Compression springs 43 are provided between the torque transmission disc plate 40 fixed on the front end surface of the cutter drive shaft 12 and the cutter holder 10 so that the cutter holder 10 is always urged downward by the springs 43, that is, in the direction tending to separate the cutter holder 10 from the die 3.

Next, the operation of the cutter position adjustment device in the conventional granulating apparatus will be described.

First, when the die 3 is cleaned, the cutter knives 11 replaced, or the like, the housing 15 is mounted on a truck 44 as shown by a phantom line in FIG. 2, and the bolts 7 coupling the cutter casing 4 and the die 3 with each other are removed. Then, the truck 44 is made to move so that the whole cutter device constituted by the cutter casing 4 and the housing 15 can be separated from the die 3. As a result, since a sufficient working space can be secured between the die 3 and the cutter 5, the cleaning, replacement, or other operations can be performed.

After completion of the work, the cutter casing 4 is placed in contact with the die 3 and fixed thereon through a procedure reverse to the foregoing, and adjustment of the cutter position can be performed while the extruding machine is in the stopped state.

To perform the positional adjustment, first, the fine adjustment mechanism 19 is operated to thereby retreat, to the maximum extent, the cutter drive shaft 12 together with the casing 13. Next, the air valve 32 is opened and the change-over valve 30 is switched to the right position, so that air having pressure adjusted by the reducing valve 31 is led into the pressurized chamber 29 of the booster 25, and pressured working oil is sent from the oil chamber 27 of the booster 25 into the oil reservoir 24 in the surrounding of the base end portion of the cutter drive shaft 12. Then, the high-pressure working oil flows into the closed chamber 38 provided on the front end side of the cutter drive shaft 12 through the oil hole 33 and oil path 34 formed in the cutter drive shaft 12. As a result, the cutter holder 10 advances toward the die 3, and the cutter knives 11 come close to the die surface 3a.

When the cutter holder 10 advances to the cutter drive shaft 12 through a full stroke, the cutter holder 10 abuts on the torque transmission disc plate 40 fixed on the front end surface of the cutter drive shaft 12 as shown in FIG. 3 so that the cutter holder 10 is prevented from further advancement. Then, the fine adjustment mechanism 19 is operated in this state to thereby make the cutter 5 slightly advance together with the cutter drive shaft 12 and the casing 13 to adjust a gap between the cutter knives 11 and the die surface 3a. When the cutter knives 11 are urged against the die surface 3a, the cutter knives 11 are made to closely contact with the die surface 3a, and the pressure in the closed chamber 38 is adjusted by the reducing valve 31.

After completion of the positional adjustment of the cutter 5, the change-over valve 30 is switched to the illustrated position so that the pressure chamber 29 of the booster 25 is opened to the atmosphere. As a result, the pistons 26 and 28 in the booster 25 are movable to thereby reduce the pressure in the closed chamber 38. Then, the cutter holder 10 is retreated by the urging force of the compression springs 43 until the blanking cover 37 abuts on the torque transmission disc plate 40 provided on the front end surface of the cutter drive shaft 12. As a result, the cutter knives 11 are sufficiently separated from the die surface 3a as shown in FIG. 2.

Next, when granulation is to be performed, the change-over valve 30 is switched to the right position to thereby supply high-pressure air into the pressure chamber 29 of the booster 25. As a result, the cutter knives 11 advance to the first set position. Next, the extruding machine is operated, and the cutter drive shaft 12 is driven to rotate by a rotary driving device such an electric motor or the like through the coupling 21. Then, the rotary force is transmitted to the cutter holder 10 through the splines 39 and 41, so that the cutter knives 11 rotate along the die surface 3a. Therefore, melted resin continuously extruded from the extruding machine through the resin path 2a and the nozzles 6, 6, . . . of the die 3 is finely cut by the cutter knives 11, and processed so as to be granulated. The thus processed resin pellets are solidified in hot water in the cutter casing 4, and discharged from the hot water outlet 9 together with hot water.

Having such a configuration as described above, the conventional plastics granulating apparatus has the following disadvantages.

(1) It is generally necessary to exchange the cutter knives every 1-3 months. The configuration has been made such that the oil path 34 is formed in the cutter drive shaft 12 and the contact state between the cutter knives 11 and the die surface 3a is changed by changing the pressure in the closed chamber 38 formed in the cutter holder 10. It is necessary to assemble the cutter knives 11 in a precise manner. Therefore, under the condition that the cutter holder 10 is mounted to the cutter drive shaft 12, it is difficult to assemble the cutter knives 11. In general, when the cutter knives 11 are assembled, the cutter holder 10 is dismounted from the cutter drive shaft 12. It has been therefore necessary to remove the blanking cover 37 of the cutter holder 10 at the time of exchange of the cutter knives 11, and the removal of the blanking cover 37 allows oil in the oil path 34 to leak outside to thereby make the exchanging work very difficult.

Further, since it is necessary to prevent air from entering the oil path 34 when the cutter holder 10 is mounted, maintenance is expensive and time consuming.

(2) The limit of the life of the cutter knives 11 is about 2 mm in term of the abrasion thereof. If the abrasion exceeds the limit, the contact width of the edge surface increases to thereby result in defective cutting of the extruded melted resin. The abrasion state of the cutter knives 11 is therefore related to the quality of the pellets produced. In the conventional configuration, however, the abrasion state of the cutter knives 11 cannot be observed from the outside during continuous operation thereof. Accordingly, the machine must be stopped, the bolts 7, coupling the cutter casing 4 and the die 3 with each other, removed to separate the whole cutter device from the die 3, and the truck 44 retreated to separate the die 3 and the housing 15 from each other, to visually inspect the abrasion state of the cutter knives 11.

(3) Further, in use, the high-pressure of air adjusted to have a predetermined pressure by the reducing valve 31 in advance is converted into oil pressure in the booster 25 prior to the start of rotation of the cutter knives 11, and then the pressurized oil is fed into the closed chamber 38 through the oil reservoir 24 and the oil path 34 to thereby urge the cutter holder 10 toward the die 3 so that the cutter knives 11 are urged against the die surface 3a by the predetermined pressure and are then subsequently rotated.

If the cutter knives 11 are made to start rotation to thereby cut melted resin continuously extruded from the nozzles 6 in hot water led into the cutter casing 4, the cutting angle of the cutter knives 11 generates a thrust force in the cutter knives 11 tending to urge the cutter knives 11 toward the die surface 3a due to the rotation of the cutter knives 11. The thrust force changes in proportion to the rotational speed. That is, the thrust force becomes large as the rotational speed becomes high.

The contact pressure between the cutter knives 11 and the die surface 3a is increased by the thrust force, and if the contact pressure exceeds a predetermined value, the cutter knives 11 are rapidly worn to thereby shorten the life thereof.

The compression springs 43 are therefore interposed between the torque transmission disc plate 40 fixed on the front end surface of the cutter drive shaft 12 and the cutter holder 10 so that the urging force of the compression springs 43 acts against the thrust force to thereby prevent the contact pressure between the cutter knives 11 and the die surface 3a from exceeding an abrasion limit value in use as described above.

With the conventional configuration, however, it has become impossible to cope with a recent tendency to increase the size of the extruding machine and increase in the rate of pellets produced. That is, the thrust force to be generated in the cutter knives 11 becomes larger and larger because of the increase in size of the cutter holder 10, the increase in number of the cutter knives 11, and the increase in rotational speed of the cutter knives 11 has rendered it impossible to provide a spring having a sufficient force against the increased thrust force, in the cutter holder 10, because of the limitation in the mounting space. As a result, the thrust force due to the rotation exceeds the allowable capability of the compression springs 43 so that the cutter knives 11 are urged against the die surface 3a by abnormal pressure to thereby promote the abrasion of the cutter knives 11 and to shorten the life thereof.

Also, since fluid pressure is applied to the rotating cutter holder 10 through the oil path 34 formed in the rotary cutter drive shaft 12, the device is exceedingly complicated so that problems such as oil leakage or the like often develop and maintenance is expensive and time consuming.

SUMMARY OF THE INVENTION

The present invention is directed to solving the foregoing problems in the prior art, and particularly to provide a method for granulating plastics in the cutter casing filled with hot water, in which a pressure medium is supplied other than through a cutter drive shaft to thereby move the cutter drive shaft forward/backward so that the exchange of cutter knives or the like can be easily performed.

According to the present invention, a plastics granulating method in which melted resin extruded from a die is cut so as to be formed into plastic particles by using cutter knives rotating in water along a die surface of the die while contacting with the die surface, includes the steps of applying a force reverse in direction to a thrust force generated by the rotation in water of the cutter knives on an axial slide mechanism for the cutter knives by using a pressure medium, and controlling contact pressure between the die surface and the cutter knives.

Also, in the method, the pressure of the pressure medium is made adjustable by means of pressure adjustment valves.

Also, in the method, the pressure adjustment valves are controlled in proportion to the rotational speed of the cutter knives.

In the plastics granulating method according to the present invention, the pressure medium is supplied to the axial slide mechanism for the cutter knives to generate a force acting in the direction reverse to a thrust force generated by the rotation of the cutter knives. As a result, the contact pressure between the die surface and the cutter knives can be controlled so that the pressing force against the thrust force due to the cutter knives is made to sufficiently act to thereby make it possible to automatically adjust the contact pressure between the cutter knives and the die surface to be in a desired state.

Further, when the cutter knives are to be exchanged, the exchanging work can be easily performed only by removing bolts because no pressure medium is housed in a cutter holder.

BRIEF DESCRIPTION OF THE DRAWINGS

FIG. 3 is an enlarged view showing the main part of FIG. 2;

DETAILED DESCRIPTION OF THE PREFERRED EMBODIMENTS

Description will be made in detail below as to preferred embodiments of the plastics granulating method in the cutter casing filled with hot water according to the present invention with reference to the accompanying drawing.

Portions the same as or corresponding to those in the conventional example are correspondingly referenced.

Figure 1:
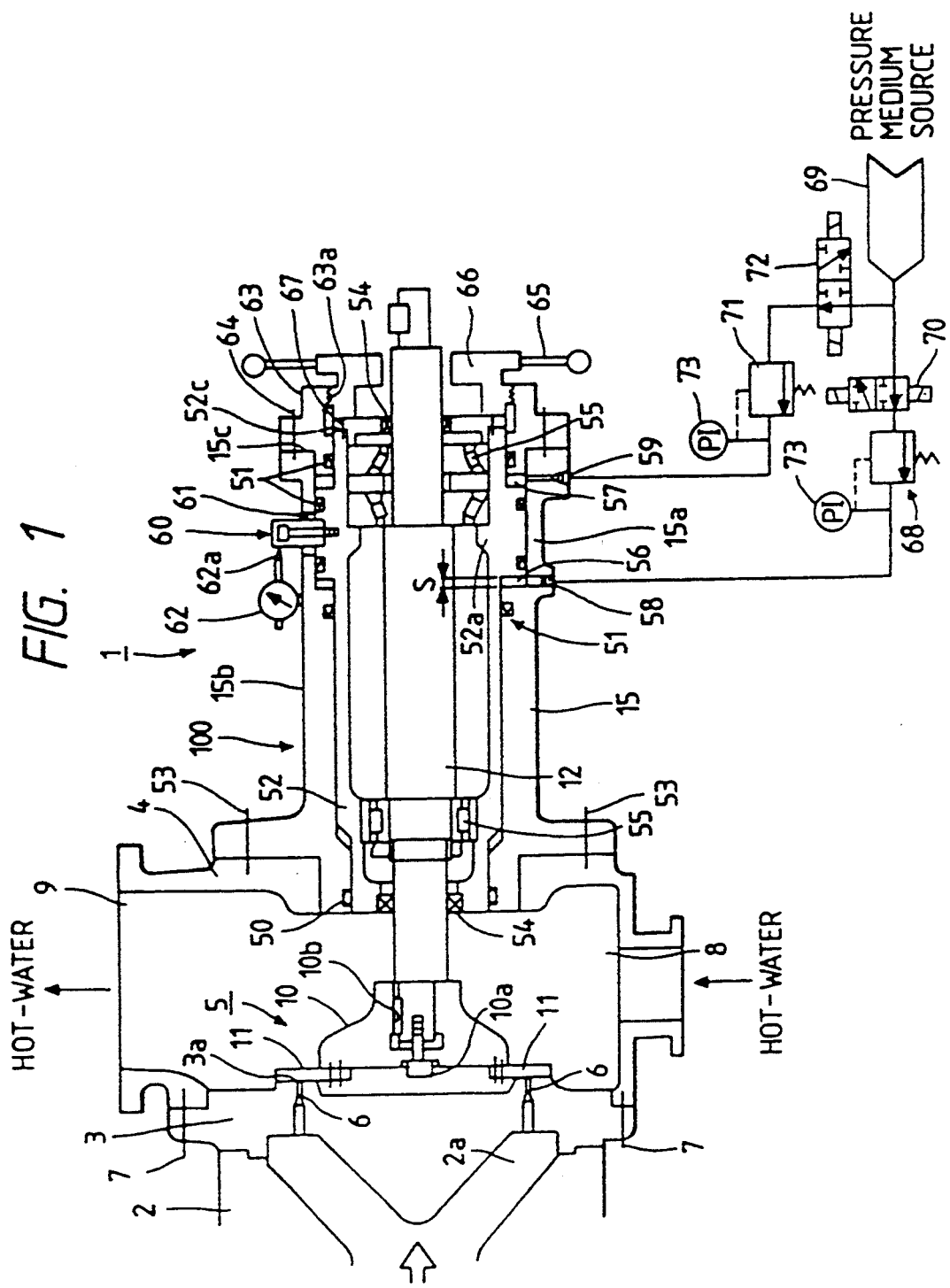
FIG. 1 is a partial sectional view showing the configuration of an apparatus for practicing the preferred embodiment of the present invention.
Figure 2:
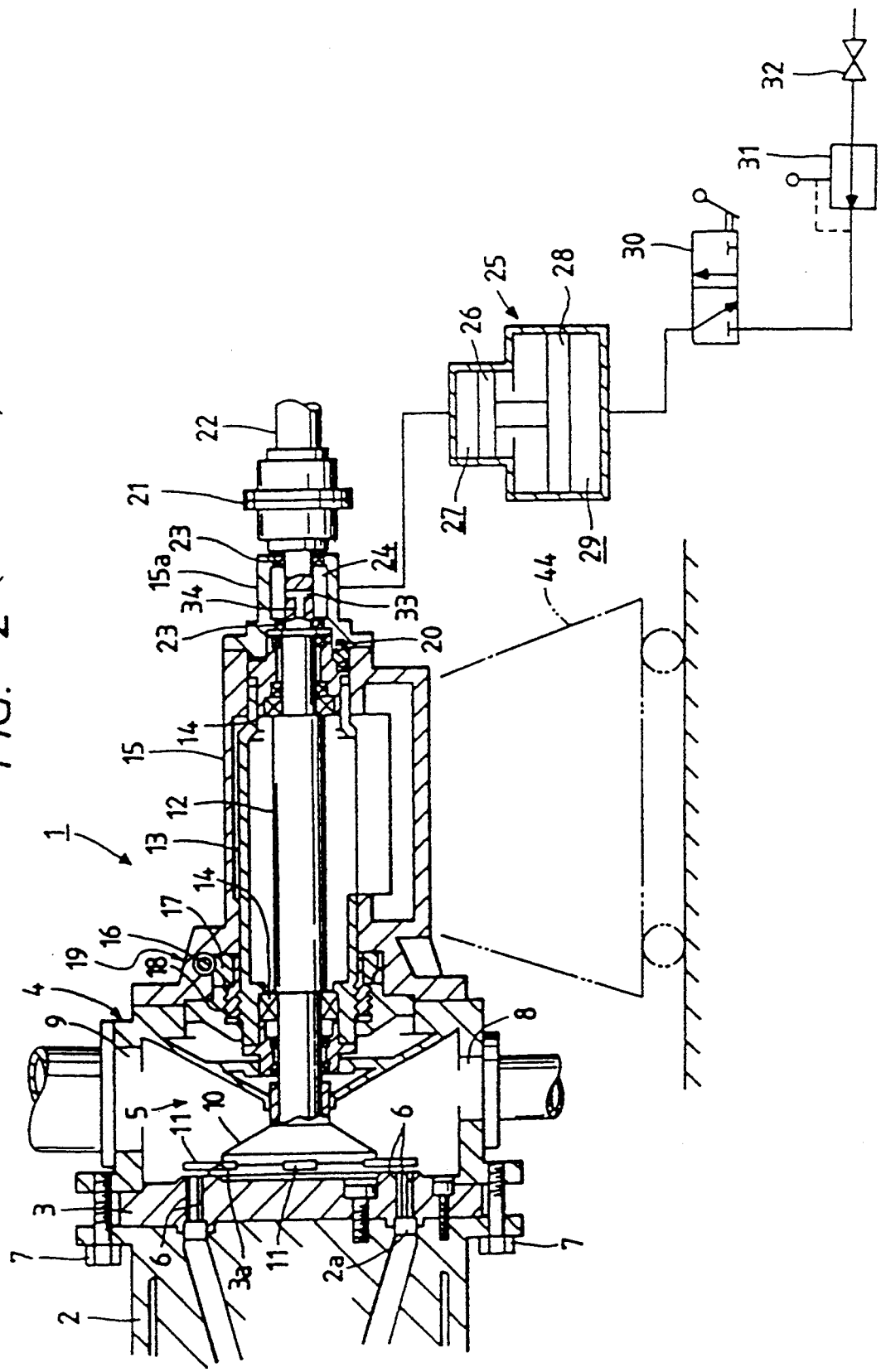
FIGS. 2 and 3 illustrate the conventional granulating apparatus.
Figure 3:
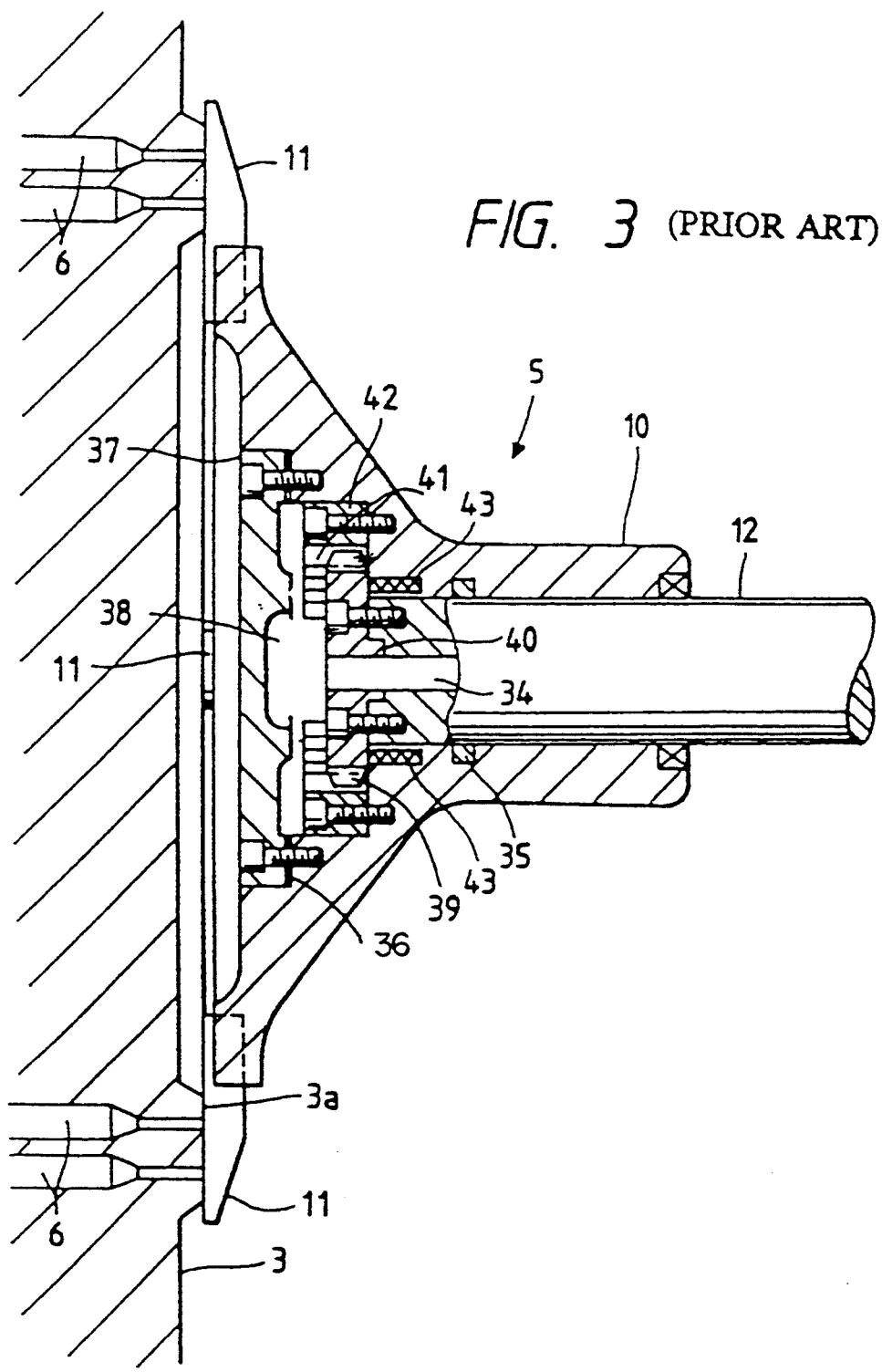

FIG. 1 is a partial sectional view showing the configuration of the plastics granulating apparatus for accomplishing a preferred embodiment of the present invention.

In the drawing, the reference numeral 1 designates a granulating device. The granulating device 1 has a manifold 2 for circumferentially distributing melted resin extruded from an extruding machine (not shown), a die 3 mounted on the manifold 2 to be in close contact therewith, a cutter casing 4 attached to the die 3, and a cutter 5 provided in the cutter casing 4.

The die 3 is disc-shaped, and a large number of nozzles 6 are formed axially through a ring-like region of the die 3 surrounding the center of the same so as to communicate with a resin path 2a. One end of the nozzles 6 are opened into the ring-like resin path 2a of the manifold 2 and the other end is opened into the cutter casing 4.

The cutter casing 4 is adapted to allow the die 3 to be easily removed through the loosening of bolts 7. The cutter casing 4 has a hot-water inlet 8 and a hot-water outlet 9 to allow hot water to be introduced therein.

The cutter 5 is configured so that a plurality of cutter knives 11 are radially fixedly supported on the outer circumference of an end surface of a cutter holder 10 facing the die 3. The cutter knives 11 are provided in opposition to a die surface 3a of the die 3, that is, in opposition to the surface of the ring-like region through which the nozzles 6 are formed. A rotary force is transmitted to the cutter holder 10 through a cutter drive shaft 12 disposed on the central axial line of the cutter holder 10. The cutter holder 10 is removably attached to the cutter drive shaft 12 through a bolt 10a and a key groove 10b.

A housing 15 has a sleeve 52 therein which is axially movable with respect to the housing 15 through an O-ring 50 and a plurality of packings 51. The housing 15 is attached to one end of the cutter casing 4 through bolts 53. The cutter drive shaft 12 is coaxially rotatably mounted in the sleeve 52 through a pair of shaft seal devices 54 and a pair of bearings 55, and the cutter drive shaft 12 is supported so as to be fixed axially (longitudinally) relative to the sleeve 52.

First and second space chambers 56 and 57 are formed between a rear portion 52a of the sleeve 52 and a rear portion 15a of the housing 15, and first and second holes 58 and 59 are formed in the first and second space chambers 56 and 57 to be communicated with the latter respectively. An axial slide mechanism 100 for the cutter knives 11 is constituted by the cutter drive shaft 12, the sleeve 52, and the housing 15.

A radially-extending key 60 projects to an exterior of the housing 15 from the rear portion 52a of the sleeve 52 through a through groove 61 formed in the rear portion 15a of the housing 15, and a detection rod 62a of a detection means 62, provided on an outer surface 15b of the housing 15 and constituted by a dial gauge or the like, abuts on the key 60.

A ring-like rear cover 63 is attached on a rear end 15c of the housing 15 through bolts 64, and a stopper 66 has operation levers 65 and a thread-engagement portion 63a which is engaged in the rear cover 63. The stopper 66 abuts on an adapter 67 coupled with a rear end 52c of the sleeve 52 through bolts 67, and the axial limit of the sleeve 52 can be adjusted by rotating the stopper 66 to thereby axially move the same.

Further, a first change-over valve 70, connected to a pressure medium source 69 having a pressure medium such as pressurized air, pressurized oil, or the like, is connected to the first hole 58 through a first pressure adjustment valve 68, and a second change-over valve 72 is connected to the second hole 59 through a second pressure adjustment valve 71. In order to monitor the pressure of the pressure medium to be supplied into the first and second holes 58 and 59, pressure gauges 73 are connected to the pressure adjustment valves 68 and 71.

In operation, pressurized fluid is introduced into the chamber 57 to urge the sleeve 52, and thus the cutter knives 11, to obtain a desired pressure force against the die 3. Thereafter, pressurized fluid is also introduced into the first space chamber 56 to oppose a thrust force generated due to a high speed rotation in water of the cutter knives 11. The above-mentioned thrust force tends to press the cutter knives 11 against the die 3 tightly, thus quickly wearing the cutter knives 11. Pressure of the fluid in the first space chamber 56 opposes this thrust to maintain a desirably predetermined pressure force between the cutter knives 11 and the die 3. By virtue of such an arrangement, the proper and desirable pressure force between the cutter knives 11 and the die 3 may be maintained to provide pellets of a desired size as well as to minimize the wear of the cutter knives 11.

In the present invention, control is accomplished through the structure consisting of the detection means 62, the pressure adjustment valves 68 and 71, and the pressure gauges 73. In particular, the thrust force generated by rotation of the cutting knives 11 can be previously measured, before extruding material through the die 3, as a function of the rotational speed of the cutter drive shaft 12. When the granulating device 1 is driven, the value of the pressure adjustment valves 68 and 71 are set in response to the thrust force indicating the pressure gauges 73. At the time of the setting of the value of the pressure adjustment valves 68, 71 the forwarded force (F4) is applied to the cutter drive shaft 12 so that the cutter knives 11 are slightly in contact and slidably rotated against the die surface 3a, which are urged against the pressure of the resin extruded from the die 3. In the granulating device 1 of the present invention, if the condition of the material extrusion from the nozzles 6 is not changed, the cutter drive shaft 12 is rotated at a constant speed.

Therefore, the set value of the pressure adjustment valves 68 and 71 can be determined as a function of the cutter rotational speed for the drive shaft 12. While the granulating device 1 is driven, the set values of the pressure adjustment valves 68 and 71 are maintained so that the cutter knives 11 are pressed against the die surface 3a with the constant force F4. The force F4 is essentially satisfied by the equation: $F4 \times N = $ constant (N: the RPM of the cutter drive shaft 12).

Figure 5:
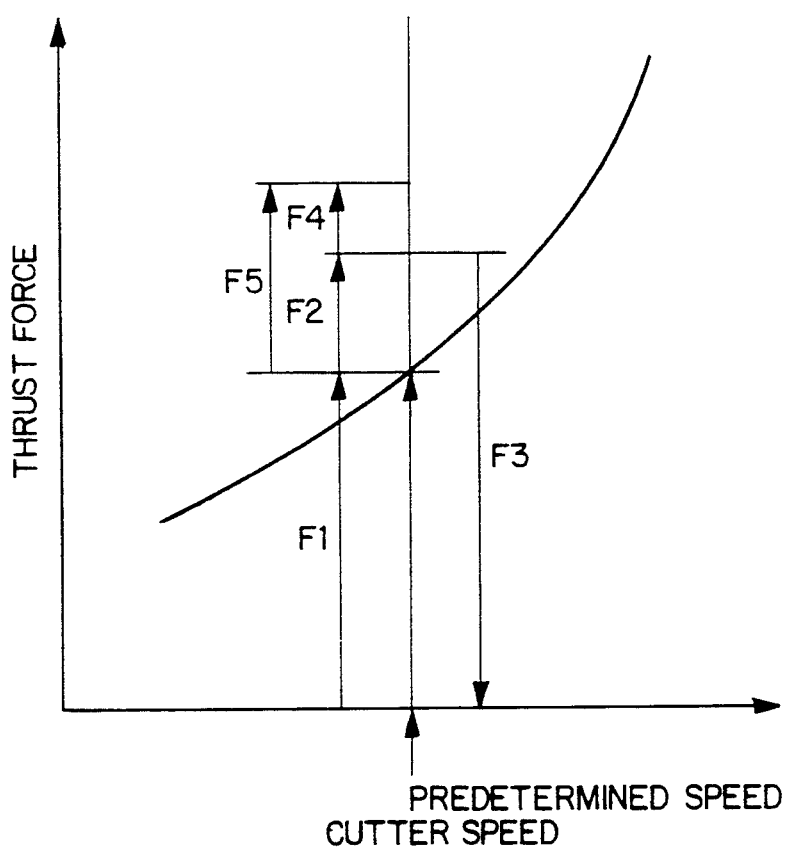
FIG. 5 is a graph illustrating the thrust force generated by rotation of the cutter and the forces on the cutter.

The thrust force generated by rotation of the cutter knives varies according to the graph illustrated in FIG. 5.

The thrust force can be measured experimentally and calculated by rotating the cutter knives 11 in water as will be described in detail below.

In a practical application, the thrust force will be measured while running the device of the present invention, for example, as follows:

1) A pressure of 3 kg/cm$^2$ is applied to the first space chamber 56 of the axial slide mechanism 100 by the pressure fluid through adjustment of the first pressure adjustment valve 68.

2) The hot water is introduced into the cutter casing 4 and the cutter knives 11 are rotated.

3) The pressure fluid is transmitted to the second space chamber 57. At this time, the pressure is gradually increased by the pressure adjustment valve 71.

4) As the pressure of the second space chamber 57 is increased, the cutter drive shaft 12 and the sleeve 52 begin to move toward the die surface 3a. This movement is detected by the dial gauge 62 and the pressure in the second space chamber 57 is noted at the time when the movement is first detected.

5) Operations 1) to 4) are performed for a plurality of rotational speeds of the cutter knives 11.

6) Finally, the thrust force is calculated for each rotational speed of the cutter knives 11.

Figure 4:
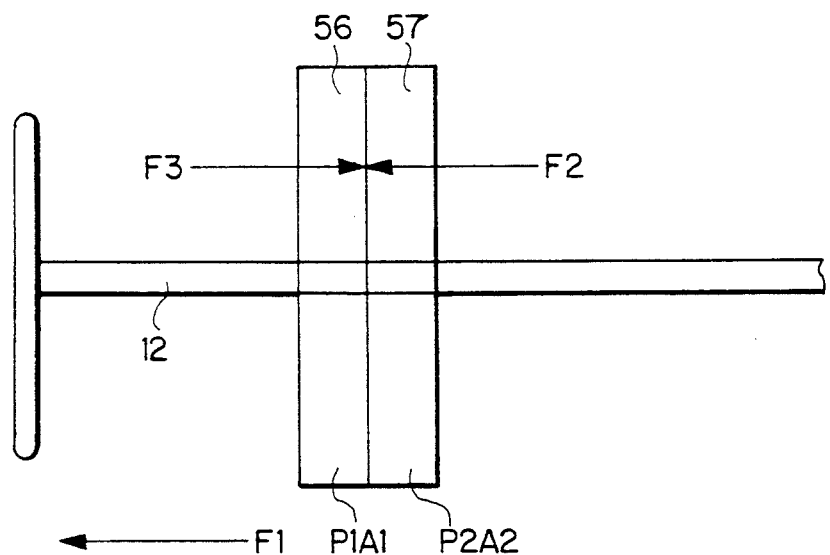
FIG. 4 illustrates the balance of forces on the cutter.

FIG. 4 illustrates the forces applied to the cutter drive shaft 12, wherein:

F1 is the thrust force,
P1 is the pressure of the first space chamber 56,
P2 is the pressure of the second space chamber 57,
A1 is the surface area of the piston in the first space chamber 56,
A2 is the surface area of the piston in the second space chamber 57.

For example, assuming that data is obtained as follows.

| No. | Cutter RPM (rpm) | P1 (kg/cm$^2$) | P2 (kg/cm$^2$) |
| --- | --- | --- | --- |
| 1 | 500 | 3 | 2.5 |
| 2 | 700 | 3 | 2.0 |
| 3 | 900 | 3 | 1.0 |

P2 is the pressure in the second space chamber 57 at the beginning of movement in the cutter drive shaft.

As a result, the thrust force is expressed by the equation as follows.

$$F1 = (P1 \times A1) - (P2 \times A2) \text{ and } (P1 \times A1) = F3,$$
$$(P2 \times A2) = F2$$

Assuming that A1 corresponds to 200 cm$^2$ and A2 corresponds to 180 cm$^2$

| No. | F1(kg) |
| --- | --- |
| 1 | 150 |
| 2 | 240 |
| 3 | 420 |

Therefore, the thrust force is shown in FIG. 5, wherein:

F4 is the load for preventing the cutter knives 11 from moving away from and pressing the die surface, F5 is the load applied to the piston disposed in the second space chamber 57 (F5=F2+F4)

In particality, the device is driven to satisfy the following equation:

$$F1 + (F2 + F4) > F3$$

F3 = The load applied to the first space chamber 56

(F2+F4) = The load applied to the second space chamber 57

If the load condition expressed by this equation is maintained, the cutter knives 11 are pressed against the die surface 3a by a suitable load F4 which is adjusted by changing load F3 and/or F2.

The loads F3 and F5 are set or changed by the pressure adjustment valves 68 and 71, respectively. The pressures of the pressure fluid controlled by the pressure adjustment 68 and 71 are detected by the pressure gauges 73, respectively.

The gauge 62 detects when the cutter is brought into contact with the die surface 3a and thus a condition of abrasion of the cutter knives 11 can be observed (if the abrasion of the cutter knives 11 has occurred, the cutter drive shaft 12 and the sleeve 52 will move in a forward direction).

Accordingly, when the granulating device 1 is driven at a constant speed, the cutter knives 11 are always pressed against the die surface 3a by applying the small constant thrust force to the cutter drive shaft 12 while the cutter knives 11 are slidably moved, thereby making it possible to perform high-efficiency granulation. This function is accomplished through a simple structure consisting of a small number of parts. In addition, the abrasion of the cutter knives 11 is easily detected, because the indication of the detector means 62 directly indicates the abrasion state of the cutter knives 11.

In the present invention, as discussed above the thrust force generated by the rotation of the cutter knives 11 in water is opposed by adjustment of pressure of the first and second space chambers 56 and 57. However, a portion of the thrust force is applied to the cutter knives 11. As a result, the cutter knives 11, the cutter drive shaft 12 and the sleeve 52 move toward the die surface 3a in accordance with the amount of abrasion of the cutter knives 11 automatically. Therefore, the cutter knives 11 are always brought in contact with the die 3 with a constant pressing force.

Next, the granulating method according to a preferred embodiment of the present invention will be described.

First, if the second pressure adjustment valve 71 is opened, the sleeve 52 is moved toward the die 3 in the housing 15 by the piston-like action of the pressure medium supplied to the second space chamber 57 so that the cutter knives 11 are urged against the die surface 3a. In this condition, the state of the detection means 62 at that time is set to zero.

In this condition, if the cutter drive shaft 12 is rotated by a drive means (not shown), the cutter knives 11 rotate at a high speed, and fused plastics (not shown) extruded from the nozzles 6 are finely cut by the cutter knives 11. The thus cut pellets are solidified in hot or cold water in the cutter casing 4, and sent from the hot water outlet 9 to treatment portion (not shown) together with the hot or cold water so that the pellets are dried to be final products.

As shown in FIG. 5, when the foregoing cutter knives 11 rotate in the water, a thrust force (F1) is generated. The thrust force changes in proportion to the rotational speed of the cutter knives 11, and even in an ordinary rotational speed region, the thrust force extensively changes from a low-speed range into a high-speed range. This tendency is remarkable particularly in a modern large capacity granulating machine 1, and the cutter drive shaft 12 is moved forward (the left direction in FIG. 1) by the generated thrust force.

The abrasion state of the cutter knives 11, that is, the quantity of abrasion thereof and the state of abnormal retreat thereof can be observed outside the apparatus by reading the gauge of the detection means 62. Moreover, when the cutter knives 11 are to be exchanged, the bolts 7 are removed after the granulating operation has been stopped and the water in the cutter casing 4 has been discharged, and the cutter casing 4 and the housing 15 are moved by using a truck as shown in the conventional examples so that the cutter holder 10 is exposed.

The method of the invention may be practiced by rotating the cutter knives 11, before the resin is extruded, in a water-filled cutter box 4 at a predetermined rotational speed. The cutter knives 11 are rotated in an predetermined rotational speed with the opposition force being applied. Next, in the case where an advancing force to be gradually increased is applied, when the cutter knives begin to move toward the die surface 3a, the increment of the advancing force is stopped and this advancing force (F2) and the opposition force (F3) are confirmed. Then, a first advancing force (F5) is determined by adding this confirmed advancing force to the predetermined advancing force (F4) pressing the cutter knives 11 against the die surface 3a. The first advancing force is less than the opposition force (the first step). Rotation of the cutter knives 11 can be stopped and the first advancing force and the opposition force can be applied to the second and the first space chambers 57 and 56, respectively, under a condition where there is no water in the cutting box 4. The cutter knives 11 can then be rotated at the predetermined rotational speed again at the removed end from the die 3. A second advancing force added to the first advancing force to overpower the opposition force is then applied to the second space chamber 57 to advance the cutter knives 11 toward the die surface 3a. Subsequently, the melted resin is extruded from the die 3, and water is introduced into the cutter box 4 when the cutter knives 11 are brought into contact with the die surface 3a. The second advancing force is decreased after water has filled the cutter box 4 to cause the cutter knives 11 to be pressed against the die surface 3a by the predetermined force.

The opposition force is predetermined in the first step. The opposition force has a direction which is opposite that of the thrust force which is generated by rotating the cutter knives 11 in the water. After the first step, it is necessary to perform the following operations in succession. The cutter knives 11 are stopped, the cutter knives 11 are moved in a backwards direction (away from the surface of the die 3) and the water is drained from the cutting box 4. After that, the rotation of the cutter knives 11 is started again (the second and third steps).

Then when the cutter knives 11 are moved forward until the cutter knives 11 reach the die surface 3a, the resin is extruded from the die 3 and water is simultaneously supplied into the water box 4 (fourth and fifth steps).

In the steps described above, when the second and third steps are conducted after the first step, the cutter knives 11 are maintained in a condition such that the first advancing force is applied to the cutter knives 11 along with the opposition force. In the fourth step, the second advancing force for overpowering the opposition force is added to the first advancing force to advance the cutter knives 11 toward the die 3. In the fifth step, when the water is applied, the cutter knives 11 generate the thrust force so that the pressure force for advancing the cutter knives 11 toward the die surface 3a is increased. Therefore, in step six, the second advancing force is removed and only the first advancing force is applied. In other words, from the first step to the sixth step, the application and the elimination of the second advancing force is conducted in response to the rotation and stoppage of the cutter knives 11, respectively.

After the first step, when the rotation of the cutter knives 11 is stopped or the water existing in the cutter box 4 is removed, the opposition force is larger than the first advancing force so that the cutter knives 11 automatically move in a backwards direction. Therefore, in the second step, when the cutter knives 11 are rotated again, the cutter knives 11 are removed from the die 3 and thus can begin rotation in a no-load state.

In the second step, when the cutter knives 11 are rotated again in the no-load condition, it is necessary to apply the opposition force in order to safely operate the device. In particular, when the advancing force is applied, the cutter knives 11 would be advanced very quickly without the application of the opposition force.

Therefore, the opposition force predetermined in the first step is applied to the cutter knives 11 along with the first and second advancing force to slowly advance the cutter knives 11. Subsequently, the second advancing force is removed.

According to the present invention, the second advancing force is adjusted and applied to the cutter knives 11 so that when the cutter knives are driven in the no-load condition, a minimal force is obtained. The invention has the advantage that proper adjustment is obtained by varying only the second advancing force. Accordingly, in order to ensure proper operation of the cutter knives 11 without applying an undesirable load to the device, it is essential to apply forces to the cutter knives 11 from opposing directions.

In the present invention, when the characteristics between the rotation of the cutter knives 11 and the thrust force had been obtained in advance, the opposition force and first advancing force are determined, in advance, in response to the thrust force of cutter knives to be rotated so that the operation of the device is started from the second step without repeating the first step.

On the other hand, the concept of the present invention can also be achieved through the following operation. Namely, by changing the opposition force instead of the application of the second advancing force. In this operation, the second advancing force is omitted. Namely, in the no-load condition, when the opposition force has been decreased to first advancing force or less, the cutter drive shaft 12 is advanced. Next, when the cutter box has been filled with the hot water, the thrust force is generated by the rotation of the cutter knives 11. At that time, the opposition force is increased to obtain the predetermined opposition force. In this operation, the proper adjustment is enjoyed by only changing the opposition force.

The opposition force is obtained automatically also in the case that rotational speed of the cutter knives 11 changes, according to the characteristics between the rotational speed of the cutter knives 11 and the thrust force obtained in advance. That is, the rotational speed of the cutter drive shaft 12 is detected and the first pressure adjustment valve 68 is adjusted on the basis of a signal (from a tachometer or the like) representing the rotational speed of the drive shaft 12 to thereby control the pressure of the pressure medium to be supplied into the first space chamber 56 and to automatically control an opposition force. The rotational speed of drive shaft 12, and thus cutter knives 11, can be determined in a known manner.

The reasons that the water is removed from the cutter box 4 after the first step is as follows. The water (hot water at, for example, 80°) passes through the cutter box 4, and is utilized for conveying and cooling the cut resin. Therefore, when the device is started while the cutter box 4 is filled with the water, the resin positioned near the die surface 3a is cooled by the water and solidified. Therefore, in this condition, it is impossible to extrude the resin by driving the extruder.

Therefore, when the second step is started, the water is removed from the cutter box 4 to increase the temperature of the die 3 so that the resin positioned in the die 3 is in a melted condition. After that, the resin is extruded from the die 3 by operating the extruder. The melted resin can then be easily extruded from the die surface 3a with the water being supplied to the cutting box 4.

The cutter holder 10 is separated from the cutter drive shaft 12 by removing the bolt 10a from the cutter drive shaft 12 in the foregoing condition, and it is possible to easily exchange each of the cutter knives 11.

The foregoing detection means 62 is not limited to the dial gauge, but, for example, an electric detection means using a potentiometer may be used. Also, control of the process can be accomplished through known transducers coupled to the apparatus and a microprocessor based control device.

The plastics granulating method according to the present invention has the following advantageous effects.

(1) The thrust force against the advancing thrust force generated in rotation of the cutter knives can be automatically controlled by regulating the pressure of a pressure medium, and therefore the contacting state between the cutter knives and the die surface is made most suitable to thereby make it possible to perform high-efficient granulation.

(2) The most suitable reaction can always be obtained by the pressure of a pressure medium even against a large thrust force generated when the cutter knives are increased in size and in number, and high-capability granulation can be attained with a high yield.

(3) The opposition force of the cutter drive shaft against the thrust force can be obtained in accordance with the rotational speed by determining the characteristics between the rotational speed and the thrust force in advance, and therefore the contacting pressure between the cutter knives and the die surface can be made most suitable.

(4) Unlike the conventional example, it is possible to separate the cutter holder from the cutter drive shaft only by separating the cutter casing from the die, without allowing any oil to leak. Therefore, the cutter knives can be easily exchanged.

(5) The abrasion of the cutter knives can be observed from the outside by using the detection means to thereby make it possible to predict the life, the quantity of abrasion, and the abnormal retreat of the cutter knives, and the biting of a polymer into between the die surface and the cutter knives can be detected from the outside.

(6) Further, since the sleeve for axially moving the cutter drive shaft is prevented from rotating by a key, and since the waterproof condition is attained by the sealing structure, no leaking of a pressure medium is caused during driving of the sleeve, and therefore maintenance can be easily performed with a high reliability.

The invention has been described through a preferred embodiment. However, various modifications can be made without departing from the scope and spirit of the invention as defined by the appended claims.

What is claimed is:

1. A plastic granulating method in which melted resin is extruded from a die and cut so as to be formed into plastic particles by cutter knives which are rotating along a die surface of said die while said cutter knives are in contact with said die surface in a water-filled cutter box, said method comprising the steps of:

rotating said cutter knives at a predetermined rotational speed in said water-filled cutter box before said resin is extruded while simultaneously applying a predetermined opposition force, which is in the direction opposite to said die surface and is larger than a thrust force which is expected to be generated by said cutter knives while rotating in water at said predetermined rotational speed, to said cutter knives;

applying and gradually increasing a predetermined first advancing force, which is in the direction of said die surface, to said cutter knives until said cutter knives start advancing toward said die surface, said opposition force and said first advancing force being predetermined based upon said thrust force which was determined before granulation, to generate a resulting predetermined force pressing said cutter knives against said die surface when granulating, said predetermined first advancing force being less than said predetermined opposition force;

removing water from said cutter box;

stopping said rotating of said cutter knives and applying said predetermined opposition force and said predetermined first advancing force to said cutter knives, under a condition where there is no water in said cutter box;

rotating said cutter knives at said predetermined rotational speed;

applying a second advancing force to said cutter knives to advance said cutter knives toward said die surface;

subsequently extruding the melted resin from said die and simultaneously introducing water into said cutter box when said cutter knives are brought into contact with said die surface;

decreasing said second advancing force after water has filled said cutter box to cause said cutter knives to be pressed against said die surface by said predetermined force and to granulate continuously.

2. A plastic granulating method in which melted resin is extruded from a die and cut so as to be formed into plastic particles by cutter knives which are rotating along a die surface of said die while said cutter knives are in contact with said die surface in a water-filled cutter box, a relationship between the rotational speed of said cutter knives and the thrust force to be generated by rotating said cutter knives in water having been obtained to predetermine an opposition force, which is in the direction opposite to said die surface and proportional to a rotational speed of said cutter knives, and a first advancing force, which is in the direction of said die surface, to generate a resulting predetermined force pressing said cutter knives against said die surface when granulating, said predetermined first advancing force being less than said predetermined opposition force, said method comprising the steps of;

applying said predetermined opposition force and said predetermined first advancing force, which are determined based on a predetermined rotational speed of said cutter knives, to said cutter knives, under a condition where there is no water in said cutter box;

rotating said cutter knives at said predetermined rotational speed;

applying a second advancing force to said cutter knives to advance said cutter knives toward said die surface;

subsequently extruding the melted resin from said die and simultaneously introducing water into said cutter box when said cutter knives are brought into contact with said die surface;

decreasing said second advancing force after water has filled said cutter box to cause said cutter knives to be pressed against said die surface by said predetermined force and to granulate continuously.

3. A plastic granulating method in which melted resin is extruded from a die and cut so as to be formed into plastic particles by cutter knives which are rotating along a die surface of said die while said cutter knives are in contact with said die surface in a water-filled cutter box, said method comprising the steps of:

rotating said cutter knives at a predetermined rotational speed in said water-filled cutter box before said resin is extruded while simultaneously applying a predetermined opposition force, which is in the direction opposite to said die surface and is larger than a thrust force which is expected to be generated by said cutter knives while rotating in water at said predetermined rotational speed, to said cutter knives, applying and gradually increasing a predetermined first advancing force, which is in the direction of said die surface, to said cutter knives until said cutter knives start advancing toward said die surface, said predetermined opposition force being determined, based upon said thrust force before granulating, to generate a resulting predetermined force pressing said cutter knives against said die surface when granulating and said predetermined first advancing force being less than said predetermined opposition force;

removing water from said cutter box;

stopping said rotating of said cutter knives and applying said predetermined opposition force and said predetermined first advancing force to said cutter knives, under a condition where there is no water in said cutter box;

rotating said cutter knives at said predetermined rotational speed;

decreasing said predetermined opposition force until it is less than said predetermined first advancing force to advance said cutter knives toward said die surface;

subsequently extruding the melted resin from said die and simultaneously introducing water into said cutter box when said cutter knives are brought into contact with said die surface;

increasing said predetermined opposition force after water has filled said cutter box to cause said cutter knives to be pressed against said die surface by said predetermined force and to granulate continuously.

4. A plastic granulating method in which melted resin is extruded from a die and cut so as to be formed into plastic particles by cutter knives which are rotating along a die surface of said die while said cutter knives are in contact with said die surface in a water-filled cutter box, a relationship between the rotational speed of said cutter knives and the thrust force to be generated by rotating said cutter knives in water having been already obtained to predetermine an opposition force, which is in the direction opposite to said die surface and proportional to a rotational speed of said cutter knives, and a first advancing force, which is in the direction of said die surface, to generate a resulting predetermined force pressing said cutter knives against said die surface when granulating, said predetermined first advancing force being less than said predetermined opposition force, said method comprising the steps of:

applying said predetermined opposition force and said predetermined first advancing force, which are determined based on predetermined rotational speed of said cutter knives, to said cutter knives, under a condition where there is no water in said cutter box;

rotating said cutter knives at said predetermined rotational speed;

decreasing said predetermined opposition force until it is less than said predetermined first advancing force to advance said cutter knives toward said die surface;

subsequently extruding the melted resin from said die and simultaneously introducing water into said cutter box when said cutter knives are brought into contact with said die surface;

increasing said predetermined opposition force after water has filled said cutter box to cause said cutter knives to be pressed against said die surface by said predetermined force and to granulate continuously.

5. A plastic granulating method as claimed in claim 1, wherein said first advancing force and said opposition force are produced by applying a pressure medium to space chambers formed between a sleeve and a housing.

6. A plastic granulating method as claimed in claim 2, wherein said first advancing force and said opposition force are produced by applying a pressure medium to space chambers formed between a sleeve and a housing.

7. A plastic granulating method as claimed in claim 3, wherein said first advancing force and said opposition force are produced by applying a pressure medium to space chambers formed between a sleeve and a housing.

8. A plastic granulating method as claimed in claim 4, wherein said first advancing force and said opposition force are produced by applying a pressure medium to space chambers formed between a sleeve and a housing.

9. A plastic granulating method as claimed in claim 5, wherein pressure of said pressure medium is made adjustable by means of pressure adjustment valves.

10. A plastic granulating method as claimed in claim 6, wherein pressure of said pressure medium is made adjustable by means of pressure adjustment valves.

11. A plastic granulating method as claimed in claim 7, wherein pressure of said pressure medium is made adjustable by means of pressure adjustment valves.

12. A plastic granulating method as claimed in claim 8, wherein pressure of said pressure medium is made adjustable by means of pressure adjustment valves.

13. A plastic granulating method of claim 9, wherein said pressure adjustment valves are controlled in proportion to the rotational speed of said cutter knives.

14. A plastic granulating method of claim 10, wherein said pressure adjustment valves are controlled in proportion to the rotational speed of said cutter knives.

15. A plastic granulating method of claim 11, wherein said pressure adjustment valves are controlled in proportion to the rotational speed of said cutter knives.

16. A plastic granulating method of claim 12, wherein said pressure adjustment valves are controlled in proportion to the rotational speed of said cutter knives.

17. A plastic granulating method as claimed in claim 1, wherein an abrasion state of said cutter knives is detected by detecting a positional relation between a housing and a sleeve.

18. A plastic granulating method as claimed in claim 2, wherein an abrasion state of said cutter knives is detected by detecting a positional relation between a housing and a sleeve.

19. A plastic granulating method as claimed in claim 3, wherein an abrasion state of said cutter knives is detected by detecting a positional relation between a housing and a sleeve.

20. A plastic granulating method as claimed in claim 4, wherein an abrasion state of said cutter knives is detected by detecting a positional relation between a housing and a sleeve.

21. A plastic granulating method as claimed in claim 1, wherein said predetermined opposition force is obtained automatically corresponding to the change of the rotational speed of the cutter knives in accordance with said relationship and the detected rotational speed of the cutter drive shaft and a first pressure adjustment value is adjusted on the basis of a signal representing the rotational speed.

22. A plastic granulating method as claimed in claim 2, wherein said predetermined opposition force is obtained automatically corresponding to the change of the rotational speed of the cutter knives in accordance with said relationship and the detected rotational speed of the cutter drive shaft and a first pressure adjustment value is adjusted on the basis of a signal representing the rotational speed.

* * * * *